(12) United States Patent
Higashira et al.

(10) Patent No.: US 9,156,998 B2
(45) Date of Patent: Oct. 13, 2015

(54) COATING AGENT

(75) Inventors: Toshihiro Higashira, Kanagawa (JP); Atsushi Yokota, Kanagawa (JP)

(73) Assignee: NOK Corporation, Tokyo (JP)

( * ) Notice: Subject to any disclaimer, the term of this patent is extended or adjusted under 35 U.S.C. 154(b) by 387 days.

(21) Appl. No.: 12/595,170

(22) PCT Filed: Apr. 2, 2008

(86) PCT No.: PCT/JP2008/056581
§ 371 (c)(1),
(2), (4) Date: Oct. 8, 2009

(87) PCT Pub. No.: WO2008/126741
PCT Pub. Date: Oct. 23, 2008

(65) Prior Publication Data
US 2010/0136352 A1    Jun. 3, 2010

(30) Foreign Application Priority Data
Apr. 10, 2007  (JP) .................................. 2007-102955

(51) Int. Cl.
| | | |
|---|---|---|
| C09D 7/12 | (2006.01) | |
| B32B 15/06 | (2006.01) | |
| C08G 18/64 | (2006.01) | |
| C08G 18/69 | (2006.01) | |
| C08G 18/72 | (2006.01) | |
| C08G 18/79 | (2006.01) | |
| C08G 18/81 | (2006.01) | |
| C08J 7/04 | (2006.01) | |
| C09D 101/28 | (2006.01) | |
| C09D 119/00 | (2006.01) | |
| C09D 175/04 | (2006.01) | |
| C09K 3/10 | (2006.01) | |
| F16J 15/10 | (2006.01) | |
| C08K 3/04 | (2006.01) | |
| C08K 5/20 | (2006.01) | |
| C08L 1/08 | (2006.01) | |

(52) U.S. Cl.
CPC ............... *C09D 7/125* (2013.01); *B32B 15/06* (2013.01); *C08G 18/6492* (2013.01); *C08G 18/69* (2013.01); *C08G 18/698* (2013.01); *C08G 18/728* (2013.01); *C08G 18/791* (2013.01); *C08G 18/8125* (2013.01); *C08J 7/047* (2013.01); *C09D 101/28* (2013.01); *C09D 119/006* (2013.01); *C09D 175/04* (2013.01); *C09K 3/10* (2013.01); *F16J 15/102* (2013.01); *C08J 2321/00* (2013.01); *C08J 2409/00* (2013.01); *C08K 3/04* (2013.01); *C08K 5/20* (2013.01); *C08L 1/08* (2013.01); *C09K 2200/047* (2013.01); *C09K 2200/0607* (2013.01); *Y10T 428/31696* (2015.04); *Y10T 428/31931* (2015.04)

(58) Field of Classification Search
CPC .................... F16J 15/102; C09K 2200/06067; C09K 2200/047; C09K 3/10; C08K 3/04; C08K 5/20; C09D 101/28; C09D 119/006; C09D 175/04; C09D 7/125; C08L 1/08; C08J 7/047; C08J 2321/00; C08J 2409/00; C08G 18/6492; C08G 18/69; C08G 18/698; C08G 18/728; C08G 18/791; C08G 18/8125; B32B 15/06; Y10T 428/31931; Y10T 428/31696
USPC ............................................ 525/54.22, 54.23
See application file for complete search history.

(56) References Cited

U.S. PATENT DOCUMENTS

| | | | | |
|---|---|---|---|---|
| 2,430,479 A | * | 11/1947 | Pratt et al. .................. | 156/331.4 |
| 3,645,939 A | * | 2/1972 | Gaylord ..................... | 525/54.23 |
| 4,092,279 A | * | 5/1978 | Piskoti ............................ | 524/18 |
| 4,380,458 A | * | 4/1983 | Callihan ......................... | 95/126 |
| 4,417,025 A | * | 11/1983 | Toba et al. ................. | 525/54.21 |
| 5,246,994 A | * | 9/1993 | Shibahara et al. ............ | 524/232 |
| 6,100,363 A | * | 8/2000 | Sampara et al. ................ | 528/76 |
| 6,759,473 B1 | * | 7/2004 | Nakamura et al. ............ | 524/503 |
| 2003/0234472 A1 | * | 12/2003 | Bolcar ....................... | 264/328.1 |

FOREIGN PATENT DOCUMENTS

| | | |
|---|---|---|
| JP | 03-252443 | 11/1991 |
| JP | 03-262707 | * 11/1991 |
| JP | 07-165953 | 6/1995 |
| JP | 2003-213122 | 8/2003 |

OTHER PUBLICATIONS

Machine Translation of Tora (JP 2003-213122) Jul. 2003.*
English Translation of International Preliminary Report on Patentability (Chapter I) and Written Opinion of the International Searching Authority from corresponding PCT application No. PCT/JP2008/056581 dated Oct. 22, 2009, 5 pages.

* cited by examiner

*Primary Examiner* — Kevin R Kruer
(74) *Attorney, Agent, or Firm* — Brinks Gilson & Lione

(57) ABSTRACT

A coating agent, which comprises a cellulose derivative, an isocyanate group-containing 1,2-polybutadiene, a synthetic wax having a softening point of 100°-150° C., a fatty acid amide having a softening point of 60°-170° C., and graphite, can satisfy desired performances, when applied to rubbery elastomers, etc. such as prevention of sticking, adhesion and blocking, and improvement of abrasion resistance, and also can serve as a surface-treating agent for vulcanized rubber without peeling of coating films due to adhesion under high-temperature compression or friction-abrasion under high specific pressure.

6 Claims, No Drawings

COATING AGENT

RELATED APPLICATIONS

The present application is a 35 U.S.C. §371 national stage filing of International Patent Application No. PCT/JP2008/056581, filed Apr. 2, 2008, to which priority is claimed under 35 U.S.C. §120 and through which priority is claimed under 35 U.S.C. §119 to Japanese Priority Patent Application No. 2007-102955, filed Apr. 10, 2007.

TECHNICAL FIELD

The present invention relates to a coating agent, and more particularly to a coating agent for elastomers for use as sealing materials, etc.

TECHNICAL BACKGROUND

Coating films of graphite, or coating films of metal salts or amides of fatty acids, wax such as paraffin, etc., silicone oil, etc. have been so far formed on the surfaces of rubbery elastomers, such as gaskets made from rubber-coated metal, bearing seals, oil seals, O rings, etc. to prevent sticking and blocking, and to improve the abrasion resistance, etc., or coating films containing ethyl cellulose, phenol resin, silicone resin, or the like as a binder have been so far formed thereon. In spite of the formation of such coating films in the case of engine gaskets, etc., the rubber coating layers on the surfaces of gaskets undergo abrasion, when used under service conditions of high specific pressure, high temperatures, and further subjected to engine vibrations, sometimes resulting in gas leakage. In the case of bearing seals, oil seals, etc., the rubber coating layers at the sliding positions of rubber elastomers undergo abrasion due to repeated sliding actions, sometimes resulting in oil leakage.

In view of such a problem, the present applicant has so far proposed coating agents for rubbery elastomers capable of forming effective gaskets, etc., while maintaining a sealability, substantially free from any phenomena of abrasion or damages to the rubber coating layers on the gasket surfaces even under severe service conditions of high specific pressure, high temperatures and further under applied vibration as in the engine gasket service circumstances, that is, a coating agent for rubbery elastomers, which comprises a hydroxyl group-containing compound of liquid 1,2-polybutadiene, an isocyanate group-containing 1,2-polybutadinene as a curing agent, and a polyolefin resin (Patent Literatures 1 and 2), and also a coating agent, which comprises an isocyanate group-containing 1,2-polybutadiene resin, a wax, and a fluororesin (Patent Literature 3).

[Patent Literature 1] Japanese Patent No. 2,827,402
[Patent Literature 2] Japanese Patent No. 3,316,993
[Patent Literature 3] Japanese Patent No. 3,893,985

However, these coating agents for the rubbery elastomers have suffered from such phenomena that the polybutadiene derivative resins, one component of the coating agents, become tacky at elevated temperatures, resulting in a decrease in the friction abrasion resistance. Thus, in some cases, the coating agent layer still has a problem in the resistance at elevated temperatures.

DISCLOSURE OF THE INVENTION

Problem to be Solved by the Invention

The object of the present invention is to provide a surface treating agent for vulcanized rubber capable of satisfying desired requirements for coating agents applicable to rubbery elastomers, etc. such as prevention of sticking, adhesion and blocking, and improvement of abrasion resistance, and incapable of peeling-off the coating films, which takes place due to the adhesion caused by high-temperature compression or due to the friction-abrasion under high specific pressure.

Means for Solving the Problem

The object of the present invention can be attained by a coating agent, which comprises a cellulose derivative, an isocyanate group-containing 1,2-polybutadiene, a synthetic wax having a softening point of 100°-150° C., a fatty acid amide having a softening point of 60°-170° C., and graphite.

Effect of the Invention

The present coating agent has the following effects when used in the surface treatment of rubber:
(1) Distinguished coatability of the coating agent
(2) No occurrence of blocking between the surface-treated rubber members themselves
(3) The surface of the surface-treated rubber has a lower friction resistance and a lower sliding resistance, and thus has a distinguished mounting workability
(4) Chemical bonds can be much more formed between the functional groups of the coating agent and rubber, and thus desired performances such as lower friction resistance and lower sliding resistance can have a longer durability, or not only the abrasion at rubber can be reduced, but also the durability or non-adhesiveness at elevated temperatures of the surface-treated rubber can be attained, thereby reducing the adhesion or sticking to metals and the same effect is obtained even at elevated temperatures
(5) Even if the coating thickness is made thinner (10 μm or less), coating can be attained at a low-cost without any coating unevenness, while keeping a flexibility without lowering the rubber characteristics, slidability and non-adhesiveness, and a distinguished sealability particularly in the case of sealing parts
(6) The coating agent contains neither silicone resin, nor silicone rubber, nor silicone oil, etc., and thus can be applied to positions having a possibility of electrical contact failure
(7) The coating agent comprises a polybutadiene derivative, a cellulose derivative, a wax, and graphite, and thus there is no possibility of out gassing or the consequent pollution problem, enabling application to IT-related parts
(8) The conventional coating films containing a fluororesin are so hard that cracking or peeling of the films occurs in the case of sealing parts, due to a decrease in the sealability or repetitions of compression-release motions, whereas the present coating agent contains a polybutadiene derivative (and wax), thus giving a flexibility to the films, thus the conventional problems can be completely overcome
(9) The cellulose derivative contained in the present coating agent can improve the coatability, and reaction between the cellulose derivative and the isocyanate group-containing 1,2-polybutadiene as contained can improve the film strength and can prevent adhesion of polybutadiene, thereby improving the friction-abrasion resistance characteristics at elevated temperatures

BEST MODES FOR CARRYING OUT THE INVENTION

The cellulose derivative for use in the present invention includes methyl cellulose, ethyl cellulose, carboxymethyl cellulose, carboxymethylethyl cellulose, hydroxyethyl cellulose, hydroxypropyl cellulose, ethylhydroxyethyl cellulose, etc., and preferably methyl cellulose, carboxymethyl cellulose, and carboxymethylethyl cellulose, and can be used in a proportion of 5-40% by weight, preferably 10-30% by weight, on the basis of total solid matter components in the film formed from the coating agent. When the proportion of the cellulose on the basis of total solid matter components in the film is less than 5% by weight, the friction abrasion resistance characteristics at elevated temperatures will be lowered, or the adhesiveness will be increased, and when no cellulose is used at all, the lower adhesiveness at elevated temperatures and the high-temperature abrasion resistance will be reduced, whereas when the proportion of the cellulose is more than 40% by weight, the slidability will be deteriorated, the friction-abrasion resistance characteristics will be lowered, thereby the adhesive force will be increased, though the adhesive tightness toward the rubber can be satisfied. The cellulose derivative can improve the film strength due to reaction with the isocyanate group-containing 1,2-polybutadiene, and can prevent adhesion of the polybutadiene and also can improve the friction-abrasion resistance characteristics at elevated temperatures.

The isocyanate group-containing 1,2-polybutadiene for use in the present invention is such that 50% or more of butadiene units have 1,2-bonds and including the terminally added isocyanate groups, and the number average molecular weight Mn is about 1,000 to about 3,000, and commercially available products, for example, Nisso TP-1001 (50wt. % solution in butyl acetate, a product of Nippon Soda Co., Ltd.), etc. can be used directly as such. The polybutadiene resin has a better compatibility with rubber than the polyurethane resin likewise react through the isocyanate groups and can undergoes higher polymerization, and thus has a good adhesive tightness toward the rubber, and particularly a good friction-abrasion resistance characteristics.

Isocyanate compounds for the introduction of isocyanates into the 1,2-polybutadiene in the present invention include, for example, aromatic or aliphatic polyisocyanates or monoisocyanates such as tolidinediisocyanate, 4,4'-diphenylmethanediisocyanate, dianisidinediisocyanate, tolidenediisocyanate, hexamethylenediisocyanate, metaxylylenediisocyanate, phenylisocyanate, p-chlorophenylisocyanate, o-chlorophenylisocyanate, m-chlorophenylisocyanate, 3,4-dichlorophenylisocyanate, 2,5-dichlorophenylisocyanate, methylisocyanate, ethylisocyanate, n-propylisocyanate, n-butylisocyanate, octadecylisocyanate, 1,5-naphthalenediisocyanate, polymethylenepolyphenylisocyanate, triphenylmethanetriisocyanate, transvinylenediisocyanate, etc., and practically commercially available products, for example, Desmodur (a product of Bayer Co.) Coronate (a product of Japan Polyurethane Co.), Takenate (a product of Takeda Chemical Industries, Ltd.), etc. can be used directly as such.

The isocyanate group-containing 1,2-polybutadiene has an isocyanate group as a terminal group, and can be further higher moleculized by reaction with functional groups on the surface of vulcanized rubber, or 1,2-polybutadiene containing active hydrogen groups such as hydroxyl groups, carboxyl groups, etc. For practical use, the hydroxyl group-containing 1,2-polybutadiene, where the hydroxyl groups are added as terminal active hydrogen groups, is such that 50% or more of butadiene units have 1,2-bonds and a number average molecular weight Mn of about 1,000 to about 3,000. Practically, commercially available products, for example, Nisso G-1000, C-1000, GQ-1000, GQ-2000, etc. (products of Nippon Soda Co., Ltd.) can be used directly as such.

When the isocyanate-containing 1,2-polybutadiene and the active hydrogen group-containing 1,2-polybutadiene are used in a mixture, the isocyanate group-containing 1,2-polybutadiene can be used in a proportion of 50% by weight or more, preferably 60% by weight or more, whereas the active hydrogen group-containing 1,2-polybutadiene can be used in a proportion of 50% by weight or less, preferably 40% by weight or less. When the isocyanate group-containing 1,2-polybutadiene is used in a proportion of less than 50% by weight, the adhesive tightness toward rubber will be lowered, both of the slidability and non-adhesiveness will be also lowered, and furthermore the friction-abrasion resistance characteristics will be lowered.

Furthermore, a mixture (reaction product) of the active hydrogen-containing 1,2-polybutadiene with the afore-mentioned isocyanate compound can be used as an isocyanate group-containing 1,2-polybutadiene, where the isocyanate compound is used in a proportion of at least one equivalent weight in terms of the isocyanate groups to the active hydrogen groups.

The isocyanate group-containing 1,2-polybutadiene can be used in a proportion of 20-70% by weight, preferably 30-60% by weight, on the basis of total solid matter components in the film formed by the coating agent. In the case of using the isocyanate group-containing 1,2-polybutadiene as a mixture with the active hydrogen group-containing 1,2-polybutadiene, the isocyanate group-containing 1,2-polybutadiene in the mixture can be used in an amount corresponding to the above-mentioned proportion as in the coating agent. When the proportion of the isocyanate group-containing 1,2-polybutadiene on the basis of total solid matter components that form the film is less than 20% by weight, graphite will much fall away, and when the proportion is zero, the adhesive tightness toward rubber will be lowered, deteriorating the abrasion resistance and the low-stickiness performance. Furthermore, lowering of adhesive tightness toward rubber leads to lowering of the friction-abrasion resistance characteristics. In a proportion of more than 70% by weight, on other hand, the slidability will be deteriorated, and therefore the friction-abrasion resistance characteristics will be lowered, and the sticking force will be increased, though the adhesive tightness toward rubber can be satisfied.

As to the wax, both of synthetic wax and fatty acid amide were used together in the present invention. Synthetic wax having a softening point of 100-150° C. is used. Specifically, microcrystalline wax, paraffin wax, polyethylene wax, and Sasol wax (Fischer-Tropsch wax), preferably Sasol wax having the same levels of slidability and lubricability as those of microcrystalline wax, and also the same levels of high melting point and friction-abrasion resistance characteristics as those of polyethylene, is used. Sasol wax has a higher softening point than that of paraffin wax, and thus the coating film can have a high strength at elevated temperatures and a distinguished high-temperature abrasion resistance. Sasol wax has a smaller molecular weight than that of polyethylene and can satisfy the desired lubricability, though the coating films have a some what lower strength at elevated temperature, and thus can be obtained the desired high-temperature abrasion resistance.

Sasol wax is a wax prepared from coal as the raw material by a process for synthesizing hydrocarbons through hydrogenation reaction of carbon monoxide, and is characterized by a essentially linear molecular structure consisting of linearly linked saturated hydrocarbons, i.e. substantially free from branched chains, and also by a high melting point, hardness, and a low viscosity.

Synthetic wax has a better lubricability at elevated temperatures and thus has a improved abrasion resistance at elevated temperature, but becomes soft and sticky at elevated temperatures in the case of a larger wax proportion, resulting in a decrease in the film strength and consequently in the hot abrasion resistance. That is, when synthetic wax having a higher softening point than 150° C. is used, the slidability at elevated temperatures and the non-adhesive performance will be lowered, whereas in the case of using synthetic wax having a lower softening point than 100° C., the adhesive tightness of coating agent toward rubber and the friction-abrasion resistance characteristics at elevated temperatures will be lowered.

Fatty acid amides having a softening point of 60°-170° C., preferably 70°-120° C. is used in the present invention. Specifically, fatty acid amides, such as oleic acid amide, stearic acid amide, lauric acid amide, etc., and N-substituted fatty acid amides or N-substituted aromatic amides such as ethylenebisstearic acid amide, stearylstearic acid amide, methylolstearic acid amide, ethylenebislauric acid amide, hexamethylenebisoleic acid amide, xylylenebisstearic acid amide, etc., preferably oleic acid amide and stearic acid amide, can be used. The lower the softening point of fatty acid amides, the more distinguished the slidability and the lubricability. In the case of using fatty acid amides having a lower softening point than 60° C., the stickyness becomes observable at the ordinary temperature, deteriorating the low-adhesiveness, whereas in the case of using fatty acid amides having a higher softening point than 170° C., the slidability and the lubricability will be deteriorated.

The synthetic wax and the fatty acid amide are mixed in a proportion of 2:8-8:2 by weight to form a wax components. When the synthetic wax is used in a proportion of less than 2 by weight ratio, the high-temperature abrasion resistance will be lowered, though the adhesive force at elevated temperature is lowered, whereas in a proportion of more than 8 by weight ratio, the friction coefficient will be increased, increasing the adhesive force, though the high-temperature abrasion resistance can be improved. In the case of using Sasol wax alone as a single wax component, adhesion takes place at elevated temperatures, whereas in the case of using fatty acid amide alone as a single wax component, better high-temperature abrasion resistance is unexpectable. That is, use of these two wax components, i.e. synthetic wax and fatty acid amide, can satisfy the adhesion prevention and good abrasion resistance at elevated temperatures at the same time.

For these wax, commercially available products can be used directly as such. The wax can be used in a proportion of 5-50% by weight, preferably 10-40% by weight, on the basis of total solid matter components in the film formed by the coating agent. When the wax is in a proportion of more than 50% by weight on the basis of total solid matter components that form the film, the adhesive tightness toward rubber will be lowered, decreasing the friction-abrasion resistance characteristics, whereas in a proportion of less than 5% by weight the slidability and the adhesion prevention will be deteriorated.

Graphite for use in the present invention includes, for example, flaky graphite, soil graphite, synthetic graphite, etc. Commercially available products can be used directly as such. The graphite can be used in a proportion of 5-50% by weight, preferably 7-40% by weight, on the basis of total solid matter components in the film formed by the coating agent. When the proportion of graphite on the basis of total solid matter components that form the film is more than 50% by weight, the graphite is easy to fall away from the coating film, and when the coating film comes in contact with or pressed by the mating metal surface, the fallen-away graphite will easily foul the mating metal surface, whereas in a proportion of less than 5% by weight the coating film will be easily worn out. When no graphite is used, the strength of the coating film will be lowered, and the absence of the graphite lubricability will deteriorate the high-temperature abrasion resistance.

These essential components are dispersed in an organic solvent to prepare a coating agent. The organic solvent for use in the present invention includes aromatic hydrocarbons, esters, ketones, etc., for example, toluene, xylene, ethyl acetate, butyl acetate, acetone, methyl ethyl ketone, methyl isobutyl ketone, di-n-propyl ketone, cyclohexanone, phorone, isophorone, ethyl cellosolve, methyl cellosolve, etc. Degree of dilution by the organic solvent can be selected appropriately, depending on coating layer thickness and coating method, and is generally selected so as to have a concentration of solid matters of about 3 to about 20% by weight. Coating layer thickness is generally 1-10 μm, preferably 2-6 μm. When the coating layer thickness is smaller than 1 μm, the rubber surface cannot be fully coated, deteriorating the slidability and non-adhesive property, whereas when the coating layer thickness is larger than 10 μm, the appearance of the coating layer surface will be worsened and the rigidity will be increased, deteriorating the sealability and the flexibility. For use as sealing parts, etc., the coating layer thickness is preferably about 2 to about 6 μm.

Elastomers to be treated with the coating agent includes ordinary rubber materials, for example, fluororubber, nitrile rubber, hydrogenated nitrile rubber, ethylene-propylene (-diene) rubber, styrene-butadiene rubber, acrylic rubber, chloroprene rubber, butyl rubber, natural rubber, etc., above all, the rubber materials suffering from less blooming to the rubber surface layer of an antioxidant, oil, etc. as compounded therein are preferable. Mixing ratio of the afore-mentioned components, organic solvent species, solvent quantity, and solvent mixing ratio can be selected appropriately, depending on the rubber quality and desired object.

The coating agent can be coated onto the rubber surface by any of such unlimited coating method as dipping, spraying, roll coater, flow coater, ink jet, etc. Before coating with a coating agent, fouling matters, etc. on the rubber surface are preferable to remove therefrom. Particularly, when there are on the rubber surface blooming matters and breeding matters deposited from the rubber, washing with water, a detergent, an organic solvent, etc. and drying is carried out.

The coating agent as coated onto the rubber surface is heat treated, for example, at about 150° to about 250° C. for about 1 minutes to about 24 hours. When the heat treatment temperature is lower than about 150° C., curing of the film and adhesive tightness toward the rubber will be not satisfactory, deteriorating the non-adhesive property and the slidability, whereas at a higher heat treatment temperature than about 250° C., heat aging of rubber will take place. Thus, the heat treatment temperature must be selected appropriately, depending on the heat resistances of various rubber species, and also on the heating duration.

In the case of articles requiring reduction in quantity of out gases, heat treatment, pressure reduction treatment, extraction treatment, etc. is carried out independently or in combination thereof, and above all, the heat treatment is economically most preferable. To reduce the quantity of out gases, it is preferable to conduct the heat treatment at about 150° to about 250° C. for about 1 to about 24 hours. To gasify the low-molecular weight components contained in the rubber and also in the wax and polybutadiene in the film, the higher the temperature and the longer the time, the more effective.

The present coating agent can be used as a coating agent for preventing adhesion of the rubber surface of a rubber-metal laminate, which comprises, for example, a metallic sheet, an adhesive layer, and a rubber layer, as formed one upon another in this order.

Metallic sheets for use herein includes, stainless steel sheets, mild steel sheets, zinc-plated steel sheets, SPCC steel sheets, copper sheets, magnesium sheets, aluminum sheets, aluminum die-cast sheets, etc., which are usually used in a defatted state. If required, the surfaces of metallic sheets can be roughened by shot-blast, scotch brite, hairline, dull finish, etc. The sheet thickness for use herein is generally about 0.1 to about 1 mm.

A primer layer is preferably formed on the metallic sheet. The primer layer is desirable to considerably improve the heat resistance and the water resistance related to the rubber adhesion of the rubber-metal laminate. Particularly in the case of using the rubber-metal laminate as sealing materials, it is desirable to provide the primer layer.

The primer layer for use herein includes a zinc phosphate film, a iron phosphate film, a coating-type chromate film, inorganic films of vanadium, zirconium, titanium, molybdenum, tungsten, manganese, zinc, cerium, or compounds thereof, particularly oxides, etc. of these metals, organic films of silanes, phenol resin, epoxy resin, polyurethane, etc., where commercially available chemical liquids or well known art can be generally used directly as such. Preferably, a primer layer containing an organometallic compound having at least one chelate ring and an alkoxy group, or further containing a metal oxide or silica, or more preferably a primer layer containing a hydrolysis condensation product of an amino group-containing alkoxysilane with a vinyl group-containing alkoxysilane in addition to the above-mentioned primer layer-forming components can be used. The hydrolysis condensation product can be also used alone.

The primer comprising the above-mentioned components can be prepared into a solution in an organic solvent, such as alcohols, e.g. methanol, ethanol, isopropyl alcohol, etc., ketones, i.e. acetone, methyl ethyl ketone, etc. or the like, so that a concentration of solid matters thereof becomes about 0.2 to about 5% by weight.

The resulting primer solution is coated onto a metallic sheet at a coating weight rate of about 50 to about 200 mg/m$^2$ by spraying, dipping, brushing, roll coater, etc., and dried at room temperature or by hot air, and then baked at about 100° to about 250° C. for about 0.5 to about 20 minutes to form a primer layer.

A vulcanizing adhesive according to the species of rubber to be vulcanization bonded can be coated onto the primer layer. For example, the adhesive for NBR, such commercially available adhesives as various resin films of silane, phenol resin, epoxy resin, polyurethane, etc. can be generally used directly as such. Preferably, an adhesive comprising two types of phenol resin, e.g. novolak-type phenol resin and resol-type phenol resin, and unvulcanized NBR can be used.

The adhesive comprising the above-mentioned components is dissolved in an organic solvent such as ketones, for example, methyl ethyl ketone, methyl isobutyl ketone, etc. or aromatic hydrocarbons, for example, toluene, xylene, etc., or the like alone or in mixture thereof, and used in a liquid state.

The adhesive layer can be formed on the metallic sheet, preferably onto the primer layer formed-metallic sheet, by coating the adhesive, followed by air drying at room temperature and then by heating at about 100° to about 250° C. for about 5 to about 30 minutes.

An unvulcanized rubber compound, which comprises fluororubber, NBR, hydrogenated NBR, acrylic rubber, chloroprene rubber, or the like, a vulcanizing agent, a reinforcing agent, and other necessary compounding agents, is applied to the thus formed vulcanizing adhesive layer by a pressure molding method such as compression molding, injection molding, etc. under molding conditions of about 150° to about 220° C. for about 5 to about 20 minutes to form a rubber layer thereon, or the unvulcanized rubber compound is dissolved or dispersed into an organic solvent having a boiling point of not higher than 250° C., such as ketones, aromatic hydrocarbons, or a mixture thereof to prepare a rubber coating agent, and then the rubber coating agent is coated onto the vulcanizing adhesive layer, dried, and further heat treated under the film-forming conditions of about 120° to about 250° C. for about 1 minute to about 15 hours to form a rubber layer of the rubber-metal laminate. Then, a coating agent layer is formed on the resulting rubber layer in the same manner as already mentioned before.

EXAMPLES

The present invention will described in detail below, referring to Examples.

Example 1

|  | Parts by weight |
|---|---|
| Methyl cellulose (a product of Shin-Etsu Chemical Co., Ltd.); as a 10% solution in toluene) | 130 (13) |
| Isocyanate group-containing 1,2-polybutadiene (TP1001, a product of Nippon Soda Co., Ltd.; as a 50% solution in butyl acetate) | 65 (32.5) |
| Sasol wax (a product of Sasol Co.; softening point: 110° C., particle size: 2 μm or less; as a 15% solution in toluene) | 73 (10.95) |
| Oleic acid amide (Diamid 0-200, a product of Nippon Kasei Chemical Co., Ltd.; softening point: 75° C.; particle size: 2 μm or less; as a 15% solution in toluene) | 73 (10.95) |
| Graphite (C-1, a product of Nichiden Carbon Co., Ltd.) | 7.8 (7.8) |
| Toluene | 653 |

The foregoing coating agent components (where the solution concentration is % by weight, and numerals in parentheses show parts by weight of solid matters) were mixed together, and the resulting solution in toluene (concentration of solid matters: 7.5% by weight) was coated onto each of vulcanized fluororubber members, e.g. compression molded sheets (60 mm×25 mm×2 mm), O rings (inner diameter: 119.6 mm; thickness: 7 mm in diameter; identification mark: P120), and oil seals (inner diameter 85 mm; outer diameter 105 mm; width: 13 mm) to a thickness of about 5 μm by spraying, heat treated at 200° C. for 2 minutes, and then subjected to the following adhesion test between the rubber sheets themselves at room temperature, O ring leak test, and oil seal revolution test:

Room temperature adhesion test between rubber sheets themselves: The above-mentioned coating treatment was applied to 15 mm-square laminating part of the vulcanized fluororubber sheets, and then the rubber of the laminating parts were pressure bonded to each other at the coating sides under specific pressure of 0.15 kgf/cm$^2$ (0.015 MPa) for 24 hours in a constant temperature-constant humidity tank at 40° C. and a humidity of 95%, and the resulting pressure-bonded laminating parts as a test piece for tensile shearing bonding strength were subjected to a room temperature adhesion test to determine the tensile strength at room temperature, according to JIS K6850 tensile shearing bonding strength test procedure corresponding to ASTM D1002, thereby evaluating the surface adhesive force O ring leak test: the above-mentioned coating treatment was applied to a vulcanized fluororubber O ring, which was then subjected to an O ring leak test by a helium gas leak detector to determine a helium gas leakage at 3 minutes after the injection of helium gas under 5% compression of the O ring Oil seal revolution test: the above-mentioned coating treatment was applied to the lip surfaces of vulcanized fluororubber oil seal, and the resulting oil seal was subjected to an oil seal revolution test under conditions of test temperature: 100° C. and revolution rate: 2,000 rpm to determine the occurrence of oil leak and coating film peeling, at one hour after the start of the test in a tightly oil-sealed state

[Preparation of Rubber-metal Laminate]

A silane-based primer obtained by mixing 1.0 parts by weight of titanium tetra(acetylacetonate), 2.5 parts by weight of alkoxysilane hydrolysis condensate, 10.0 parts by weight of water, and 86.5 parts by weight of methanol under stirring for a few minutes, was applied onto an alkali-defatted stainless steel sheet (SUS301, a product of Nisshin Steel Co., Ltd.) having a thickness of 0.2 mm by dipping, dried by hot air, and then baked at about 200° C. for 5 minutes to form a primer layer (coating weight rate: 250 mg/m$^2$). The alkoxysilane hydrolysis condensate used herein was prepared in the following manner:

40 parts by weight of γ-aminopropyltriethoxysilane and 20 parts by weight of water were charged into a three-necked flask provided with a stirrer, a heating jacket, and a dropping funnel, and adjusted to pH of 4-5 with acetic acid, followed by stirring for a few minutes. Under further stirring, 40 parts by weight of vinyltriethoxysilane was slowly dropwise added thereto through the dropping funnel. After the completion of the dropwise addition, refluxing was conducted with heating at about 60° C. for 5 hours, followed by cooling to room temperature, thereby obtaining the alkoxysilane hydrolysis condensate.

A solution of adhesive composition prepared by adding 2 parts by weight of unvulcanized NBR (N-237, a product of Japan Synthetic Rubber Co., Ltd. (JSR), medium-high nitrile content) to 90 parts by weight of methyl ethyl ketone, followed by further addition of 5 parts by weight of resol-type phenol resin (Chemlock TS1677, a product of Lord Far East Co., Ltd.) and 3 parts by weight of chlorinated polyethylene (SE-200Z, a product of Daiso Co., Ltd.) thereto was applied onto the primer layer, air dried at room temperature, and then heated at about 200° C. for about 5 minutes to form an adhesive layer. Then, a solution of the following NBR composition having a concentration of solid matters of 25% by weight in a solvent mixture of toluene:methyl ethyl ketone=9:1 was applied onto the adhesive layer, and dried to form an unvulcanized rubber layer having a thickness of about 20 μm. Then, press vulcanization was conducted at 180° C. for 6 minutes, and the afore-mentioned coating agent was applied onto the thus formed vulcanized rubber layer by dipping and subjected to heat treatment with hot air at 200° C. for 2 minutes to form an adhesion-preventing layer having a thickness of 5 μm. That is, a rubber-metal laminate in size of 60 mm×25 mm was obtained.

| (NBR composition) | |
|---|---|
| | Parts by weight |
| NBR (N235S, a product of JSR; nitrile content: 36%) | 100 |
| SRF carbon black | 80 |
| White carbon (Nipsil LP, a product of Japan Silica Co., Ltd.) | 40 |
| Zinc oxide | 5 |
| Stearic acid | 2 |
| Antioxidant (NOCRAC 224, a product of Ouchi-Shinko Chemical Co., Ltd.; N-isopropyl-N'-phenyl-p-phenylenediamine) | 2 |
| Triallyl isocyanurate (Taic, a product of Nippon Kasei Chemical Co., Ltd.) | 2 |
| 1,3-bis-t-butylperoxyisopropylbenzene (Sunperox TY-13, a product of Sanken Kako Co., Ltd.) | 7.5 |

The resulting rubber-metal laminate was subjected to the following dynamic friction determination test, high-temperature adhesion test, using an aluminum plate, and high-temperature friction-abrasion test:

Dynamic friction determination test: the rubber-metal laminate as surface-treated above was subjected to a dynamic friction determination test, according to JIS K7125 and P8147 corresponding to ASTM D1894 and D4521, respectively, by a surface performance tester made by Shinto Kagaku Co., Ltd., using a chromium steel frictional ball, 10 mm in diameter as a mating member under conditions of travel speed: 50 mm/min. and load: 50 g to determine a friction coefficient High-temperature adhesion test, using an aluminum plate: A 25 mm-square laminating part, which is to be a laminating part of the rubber layer of the rubber-metal laminate was pressure bonded to an aluminum plate (thickness: 20 mm) under conditions of 200° C. and 200 kgf/cm$^2$ (19.6 MPa) for 72 hours, and a test piece for tensile shearing adhesion strength was subjected to determine the tensile strength at room temperature, according to JIS K6850 tensile shearing adhesion strength test procedure, thereby evaluating the surface adhesion force High-temperature friction abrasion test: the rubber-metal laminate was subjected to a high-temperature friction-abrasion test according to JIS K7125 and P8147, by a surface performance tester made by Shinto Kagaku Co., Ltd., using a hard chromium-plated steel frictional boll, 10 mm in diameter as a mating member in a reciprocal motions under conditions of travel speed: 400 mm/min., reciprocal travel span: 30 mm, temperature 150° C., and load: 2.5 kg to evaluate friction-abrasion, i.e. to determine the number of reciprocal motions until the adhesive layer was exposed to the surface due to the abrasion of rubber Example 2

In Example 1, a reaction product of 19.5 (19.5) parts by weight of hydroxy group-containing 1,2-polybutadiene (G-1000, a product of Nippon Soda Co., Ltd.; hydroxyl value: 70 (KOH mg/g)) and 13 (13) parts by weight of isocyanate (Desmodur R, a product of Bayer Co., Ltd.; isocyanate content: 7%) was used in place of the isocyanate group-containing 1,2-polybutadiene, and the amount of toluene was changed to 685 parts by weight.

Example 3

In Example 1, the amount of graphite was changed to 21.7 (21.7) parts by weight, and the amount of toluene to 825 parts by weight.

Example 4

In Example 1, the amount of Sasol wax was changed to 44 (6.6) parts by weight, and the amount of oleic acid amide to 102 (15.3) parts by weight.

The results obtained in the foregoing Examples are shown in the following Table 1, together with calculated ratio by weight of solid matter components forming films from the respective components:

TABLE 1

|  | Example | | | |
|---|---|---|---|---|
|  | 1 | 2 | 3 | 4 |
| [% ratio by weight of solid matter components in film] | | | | |
| Methyl cellulose | 17.3 | 17.3 | 14.6 | 17.3 |
| NCO-containing polybutadiene | 43.2 | 43.3 | 36.5 | 43.2 |
| Salsol wax | 14.55 | 14.55 | 12.3 | 8.8 |
| Oleic acid amide | 14.55 | 14.55 | 12.3 | 20.3 |
| Graphite | 10.4 | 10.4 | 24.4 | 10.4 |
| [Evaluation results] | | | | |
| Room temp. adhesion test of rubber sheets themselves | | | | |
| Tensile strength (kgf) | <0.1 | <0.1 | <0.1 | <0.1 |
| O ring leak test | | | | |
| He leakage (×10$^{-11}$ Pa·m$^3$/sec.) | 5 | 10 | 10 | 5 |
| Oil seal revolution test | | | | |
| Leak occurrence | none | none | none | none |
| Coating film peeling | none | none | none | none |
| Dynamic friction determination test | | | | |
| Dynamic friction coefficient | 0.2 | 0.1 | 0.1 | 0.1 |
| High-temp. adhesion test with Al plate | | | | |
| Surface adhesive force (kgf) | 40 | <0.1 | <0.1 | 10 |
| High-temp. friction-abrasion test | | | | |
| Number until the adhesive layer is exposed | 300 | 350 | 500 | 250 |

Remark: In Table 1, "<0.1" means "below" the detectable limit (where 0.1 is detectable).

Comparative Example 1

In Example 1, neither Sasol wax nor oleic acid amide was used, but 145 (21.75) parts by weight of paraffin wax (a product of Seiko Kasei Co., Ltd.; softening point: 60° C., particle size: not more than 2 μm; as a 15% solution in toluene) was used.

Comparative Example 2

In Example 1, neither Sasol wax nor oleic acid amide was used, but 145 (21.75) parts by weight of polyethylene wax (Mitsui Chemical Co., Ltd.; molecular weight: 2,000; softening point: 110° C.; particle size: 1 μm; as a 15% solution in toluene) was used.

Comparative Example 3

In Example 1, the amount of Sasol wax was changed to 145 (21.75) parts by weight, and no oleic acid amide was used.

Comparative Example 4

In Example 1, no Sasol was used, and the amount of oleic acid amide was changed to 145 (21.75) parts by weight.

Comparative Example 5

In Example 1, neither Sasol wax nor oleic acid amide was used, but 145 (21.75) parts by weight of ethylenebisstearic acid amide (Slipax E, a product of Nippon Kasei Chemical Co., Ltd.; softening point: 140° C.; particle size: not more than 2 μm; as a 15% solution in toluene) was used.

Comparative Example 6

In Example 1, neither Sasol wax nor oleic acid amide was used, and the amount of graphite was changed to 21.7 (21.7) parts by weight, and the amount of toluene to 679 parts by weight.

Comparative Example 7

In Example 1, no graphite was used, and the amount of toluene was changed to 558 parts by weight.

Comparative Example 8

In Example 1, no methyl cellulose was used, and the amount of isocyanate group-containing 1,2-polybutadiene was changed to 88 (44) parts by weight, the amount of graphite to 7.5 (7.5) parts by weight, and the amount of toluene to 737 parts by weight.

Comparative Example 9

In Example 1, no isocyanate group-containing 1,2-polybutadiene was used, and the amount of methyl cellulose was changed to 441 (44.1) parts by weight, the amount of graphite to 7.5 (7.5) parts by weight, and the amount of toluene to 385 parts by weight.

The results in the foregoing Comparative Examples are shown in the following Table 2, together with calculated ratio by weight of solid matter components forming films from the respective components:

TABLE 2

|  | Comp. Ex. | | | | | | | | |
|---|---|---|---|---|---|---|---|---|---|
|  | 1 | 2 | 3 | 4 | 5 | 6 | 7 | 8 | 9 |
| [% ratio by weight of solid matter components in film] | | | | | | | | | |
| Methyl cellulose | 17.3 | 17.3 | 17.3 | 17.3 | 17.3 | 19.3 | 19.3 | — | 60.0 |
| NCO-containing polybutadiene | 43.3 | 43.3 | 43.3 | 43.3 | 43.3 | 48.4 | 48.2 | 59.9 | — |
| Salsol wax | — | — | 29.0 | — | — | — | 16.25 | 14.9 | 14.9 |
| Paraffin wax | 29.0 | — | — | — | — | — | — | — | — |
| Polyethylene wax | — | 29.0 | — | — | — | — | — | — | — |
| Oleic acid amide | — | — | — | 29.0 | — | — | 16.25 | 14.9 | 14.9 |
| Ethylenebisstearic acid amide | — | — | — | — | 29.0 | — | — | — | — |
| Graphite | 10.4 | 10.4 | 10.4 | 10.4 | 10.4 | 32.3 | — | 10.2 | 10.2 |

TABLE 2-continued

| | Comp. Ex. | | | | | | | | |
|---|---|---|---|---|---|---|---|---|---|
| | 1 | 2 | 3 | 4 | 5 | 6 | 7 | 8 | 9 |
| [Evaluation results] Room temp. adhesion test of rubber sheets themselves | | | | | | | | | |
| Tensile strength (kgf) | <0.1 | <0.1 | <0.1 | <0.1 | <0.1 | <0.1 | 50 | 120 | <0.1 |
| O ring leak test | | | | | | | | | |
| He leakage ($\times 10^{-11}$ Pa·m$^3$/sec) | 5 | 5 | 100 | 5 | 500 | $10^4$ | 5 | 5 | 10 |
| Oil seal revolution test | | | | | | | | | |
| Leak occurrence | none | none | none | none | none | yes | none | none | none |
| Coating film peeling | yes | none | none | yes | none | yes | none | yes | yes |
| Dynamic friction determination test | | | | | | | | | |
| Dynamic friction coefficient | 0.2 | 0.2 | 0.2 | 0.1 | 0.4 | 0.5 | 0.4 | 0.4 | 0.3 |
| High temp. adhesion test with Al plate | | | | | | | | | |
| Surface adhesive force (kgf) | 100 | 10 | 200 | <0.1 | 10 | 170 | 150 | 250 | 300 |
| High temp. friction-abrasion test | | | | | | | | | |
| Number until the adhesive layer is exposed. | 70 | 100 | 350 | 60 | 80 | 20 | 90 | 70 | 2 |

[Industrial Utility]

The present coating agent can be effectively applied to rubber seal materials such as O rings, V shaped packings, oil seals, gaskets, packings, square rings, D shaped rings, various valves, etc.; dust boots such as uniform motion joints, etc., rubber products such as diaphragms, wiper blades, etc.; vibration-preventing rubbers for engines, motors, memory devices such as hard disks, optical disks, etc.; and shock-absorbing stopper parts such as recording device heads for hard disks, etc., and printer heads, etc.

The invention claimed is:

1. A coating agent in the form of an organic solvent solution, which comprises a methyl cellulose, an isocyanate group-containing 1,2-polybutadiene, a Fischer-Tropsch wax, an oleic acid amide, and graphite, wherein solid matter components in a film formed from the coating agent comprises 5-40% by weight of methyl cellulose, 20-70% by weight of the isocyanate group-containing 1,2-polybutadiene, 5-50% by weight of total amounts of Fischer-Tropsch wax and oleic acid amide, and 5-50% by weight of graphite, wherein when the coating agent is used to form a film on a substrate the methyl cellulose reacts with the isocyanate group-containing 1,2-polybutadiene to improve film strength.

2. A coating agent according to claim 1, wherein the isocyanate group-containing 1,2-polybutadiene is a reaction product obtained by reaction of an active hydrogen group-containing 1,2-polybutadiene with an isocyanate compound used in a proportion of at least one equivalent weight in terms of the isocyanate groups to the active hydrogen groups.

3. An elastomer surface-treated by a coating agent according to claim 1.

4. An elastomer according to claim 3, where the surface-treated elastomer is a sealing material.

5. A rubber-metal laminate, wherein the rubber surface is coated with a coating agent according to claim 1.

6. A method of forming a coating layer on a substrate which comprises:
providing a coating agent in the form of an organic solvent solution, which comprises a methyl cellulose, an isocyanate group-containing 1,2-polybutadiene, a Fischer-Tropsch wax, an oleic acid amide, and graphite, wherein solid matter components in a film formed from the coating agent comprises 5-40% by weight of methyl cellulose, 20-70% by weight of the isocyanate group-containing 1,2-polybutadiene, 5-50% by weight of total amounts of Fischer-Tropsch wax and oleic acid amide, and 5-50% by weight of graphite;
providing an elastomer substrate;
coating the elastomer substrate with the coating agent; and
heat treating the coating agent on the substrate,
wherein the methyl cellulose reacts with the isocyanate group-containing 1,2-polybutadiene to improve film strength.

* * * * *